(12) United States Patent
Schmidt et al.

(10) Patent No.: US 8,658,724 B2
(45) Date of Patent: Feb. 25, 2014

(54) COPOLYAMIDES

(75) Inventors: Christian Schmidt, Ludwigshafen (DE); Faissal-Ali El-Toufaili, Ludwigshafen (DE); Philippe Desbois, Edingen-Neckarhausen (DE); Raquel Fernandez Rodiles, Heidelberg (DE)

(73) Assignee: BASF SE, Ludwigshafen (DE)

( * ) Notice: Subject to any disclaimer, the term of this patent is extended or adjusted under 35 U.S.C. 154(b) by 50 days.

(21) Appl. No.: 13/378,980

(22) PCT Filed: Jun. 15, 2010

(86) PCT No.: PCT/EP2010/058392
§ 371 (c)(1),
(2), (4) Date: Mar. 1, 2012

(87) PCT Pub. No.: WO2010/146054
PCT Pub. Date: Dec. 23, 2010

(65) Prior Publication Data
US 2012/0157594 A1    Jun. 21, 2012

(30) Foreign Application Priority Data
Jun. 19, 2009    (DE) .................. 10 2009 025 537

(51) Int. Cl.
*C08K 5/05* (2006.01)
(52) U.S. Cl.
USPC .......................................... 524/379; 528/324
(58) Field of Classification Search
USPC .......................................... 524/379; 528/324
See application file for complete search history.

(56) References Cited

U.S. PATENT DOCUMENTS

| | | | |
|---|---|---|---|
| 3,006,761 A | 10/1961 | Reichel et al. | |
| 3,449,287 A | 6/1969 | Fairfull et al. | |
| 4,640,877 A | 2/1987 | Schröder | |
| 5,688,901 A | 11/1997 | Fisch et al. | |
| 6,187,877 B1 | 2/2001 | Gotz et al. | |
| 6,754,979 B2 | 6/2004 | Ludwig et al. | |
| 2010/0184898 A1 | 7/2010 | Weber et al. | |
| 2010/0190897 A1 | 7/2010 | Maletzko et al. | |
| 2010/0190934 A1 | 7/2010 | DesBois et al. | |
| 2010/0190952 A1 | 7/2010 | DesBois et al. | |
| 2010/0197859 A1 | 8/2010 | Weber et al. | |
| 2010/0286303 A1 | 11/2010 | Weber et al. | |
| 2011/0009566 A1 | 1/2011 | Jain et al. | |
| 2011/0092645 A1 | 4/2011 | Loth et al. | |
| 2011/0144300 A1 | 6/2011 | Desbois et al. | |
| 2011/0155309 A1 | 6/2011 | Steininger et al. | |
| 2011/0196098 A1 | 8/2011 | Mettlach et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0319550 A1 | 12/2011 | Weber et al. | |
| 2012/0029106 A1 | 2/2012 | Weber et al. | |
| 2012/0059109 A1 | 3/2012 | Weber et al. | |

FOREIGN PATENT DOCUMENTS

| | | |
|---|---|---|
| DE | 755617 C | 5/1953 |
| DE | 1114728 | 10/1961 |
| DE | 1241490 B | 6/1967 |
| DE | 1918235 A1 | 1/1971 |
| DE | 3415044 A1 | 11/1985 |
| DE | 19514145 A1 | 10/1996 |
| EP | 0667367 A2 | 8/1995 |
| EP | 1 235 671 A1 | 9/2002 |
| GB | 1111076 A | 4/1968 |
| GB | 1167527 A | 10/1969 |
| GB | 1423948 A | 2/1976 |
| WO | WO 2009/003901 | 1/2009 |
| WO | WO 2009/034114 | 3/2009 |
| WO | WO-2010/018220 A2 | 2/2010 |

(Continued)

OTHER PUBLICATIONS

Ultramid 10 the soluble polyamide—(Jul. 2007), pp. 1-4, XP002570183 retried from the Internet.

(Continued)

*Primary Examiner* — Edward Cain
(74) *Attorney, Agent, or Firm* — Novak Druce Connolly Bove + Quigg LLP

(57) ABSTRACT

What are described are a solution comprising a terpolymer formed from the monomers of components A, B and C, the total amount of which adds up to 100% by weight,
  a) 5 to 60% by weight of lactams as component A,
  b) 5 to 60% by weight of equimolar amounts of adipic acid and one or more aliphatic diamines as component B,
  c) 10 to 70% by weight of equimolar amounts of adipic acid and 4,4'-diaminodicyclohexylmethane (dicycan) as component C,
in an aromatics-free solvent system comprising
50 to 100% by weight of $C_{1-4}$-alkanol,
0 to 50% by weight of water and
not more than 10% by weight of further aromatics-free solvents,
where the total amount of the solvent system adds up to 100% by weight, and a terpolymer formed from the monomers of components A, B and C, the total amount of which adds up to 100% by weight,
  a) 15 to 40% by weight of lactams as component A,
  b) 20 to 45% by weight of equimolar amounts of adipic acid and one or more aliphatic diamines as component B,
  c) 25 to 60% by weight of equimolar amounts of adipic acid and 4,4'-diaminodicyclohexylmethane (dicycan) as component C,
excluding terpolymers formed from 30 to 40% by weight of component A, 30 to 40% by weight of component B and 30 to 40% by weight of component C.

8 Claims, No Drawings

(56) References Cited

FOREIGN PATENT DOCUMENTS

| | | |
|---|---|---|
| WO | WO 2010/089241 | 8/2010 |
| WO | PCT/EP2010/069644 | 12/2010 |
| WO | WO 2011/000816 | 1/2011 |
| WO | WO 2011/009798 | 1/2011 |
| WO | WO 2011/051273 | 5/2011 |
| WO | WO 2011/069892 | 6/2011 |
| WO | WO 2011/073196 | 6/2011 |
| WO | WO 2011/073197 | 6/2011 |
| WO | WO 2011/117344 | 9/2011 |

OTHER PUBLICATIONS

U.S. Appl. No. 61/316,848.
U.S. Appl. No. 13/267,628, filed Oct. 6, 2011, Scherzer et al.
U.S. Appl. No. 13/376,665, filed Dec. 7, 2011, Weber et al.
U.S. Appl. No. 13/376,901, filed Dec. 8, 2011, Gibon et al.
U.S. Appl. No. 13/377,979, filed Dec. 13, 2011, Khvorost et al.
U.S. Appl. No. 13/382,782, filed Jan. 6, 2012, Scherzer et al.
U.S. Appl. No. 13/391,082, filed Feb. 17, 2012, Shahim et al.

COPOLYAMIDES

CROSS-REFERENCE TO RELATED APPLICATIONS

This application is a national stage application (under 35 U.S.C. §371) of PCT/EP2010/058392, filed Jun. 15, 2010, which claims benefit of German application 10 2009 025 537.0, filed Jun. 19, 2009, the contents of each of which are incorporated herein by reference in their entireties.

FIELD OF THE INVENTION

The invention relates to terpolymers formed from lactams, equimolar amounts of adipic acid and aliphatic diamines, and equimolar amounts of adipic acid and 4,4'-diaminodicyclohexylmethane (dicycan) and alcoholic solutions thereof, processes for preparation thereof and use thereof for coating solid surfaces.

BACKGROUND

Nylon-6/6,6/dicycan terpolymers and the use thereof for coating solid surfaces are known per se. DE 755 617 relates to processes for preparing condensation products, which may include nylon-6/6,6/dicycan terpolymers. Solutions of the polymers are prepared in a solvent comprising methanol, benzene or toluene and optionally water.

The terpolymers obtained do not have sufficiently high glass transition temperatures for all applications. In addition, the aromatic solutions are hazardous to health and can be disposed of only in a costly and inconvenient manner.

BRIEF SUMMARY

It is an object of the present invention to provide solutions of especially nylon-6/6,6/dicycan terpolymers which avoid the disadvantages of the known solutions. In addition, corresponding terpolymers should be provided, which especially have an increased glass transition temperature and exhibit better performance properties.

The object is achieved in accordance with the invention by a solution comprising a terpolymer formed from the monomers of components A, B and C, the total amount of which adds up to 100% by weight, a. 5 to 60% by weight of lactams as component A,
b. 5 to 60% by weight of equimolar amounts of adipic acid and one or more aliphatic diamines as component B,
c. 10 to 70% by weight of equimolar amounts of adipic acid and 4,4'-diaminodicyclohexylmethane (dicycan) as component C,
in an aromatics-free solvent system comprising
50 to 100% by weight of $C_{1-4}$-alkanol,
0 to 50% by weight of water and
not more than 10% by weight of further aromatics-free solvents,
where the total amount of the solvent system adds up to 100% by weight.

The object is additionally achieved by a terpolymer formed from the monomers of components A, B and C, the total amount of which adds up to 100% by weight, a) 15 to 40% by weight, preferably 20 to 40% by weight, of lactams as component A,
b) 20 to 45% by weight, preferably 20 to 40% by weight, of equimolar amounts of adipic acid and one or more aliphatic diamines as component B,
c) 25 to 60% by weight, preferably 30 to 60% by weight, of equimolar amounts of adipic acid and 4,4'-diaminodicyclohexylmethane (dicycan) as component C,
excluding terpolymers formed from 30 to 40% by weight of component A, 30 to 40% by weight of component B and 30 to 40% by weight of component C.

The stated weights of the polymers are based on the starting monomer weight in the mixture and not on the repeat units in the polymer.

DETAILED DESCRIPTION OF THE PREFERRED EMBODIMENTS

It has been found in accordance with the invention that the above-specified terpolymers have good solubility in an aromatics-free solvent system which generally comprises predominantly $C_{1-4}$-alkanol, and corresponding solutions have good usability for coating solid surfaces. In addition, it has been found that the inventive terpolymers exhibit an advantageous spectrum of mechanical properties and performance properties which make them particularly advantageously usable for coating solid surfaces. An increased glass transition temperature especially improves the storage and transport stability of the coating systems.

In the inventive solutions, preferably 10 to 50% by weight of component A, 10 to 50% by weight of component B and 20 to 60% by weight of component C are present in the terpolymer, the total amount of which adds up to 100% by weight.

The aromatics-free solvent system does not comprise any aromatic hydrocarbons, more particularly no benzene or toluene. It preferably comprises 70 to 100% by weight, more preferably 80 to 100% by weight, of $C_{1-4}$-alkanol, 0 to 30% by weight, more preferably 0 to 20% by weight, of water and not more than 5% by weight, more preferably not more than 2.5% by weight, especially not more than 1% by weight, of further solvents, where the total amount of the solvent system adds up to 100% by weight. More preferably, only $C_{1-4}$-alkanol and water are present in the solvent system. The $C_{1-4}$-alkanols used may be all corresponding alkanols. Preference is given to the use of methanol, ethanol, n-propanol or isopropanol, and of mixtures thereof. Particular preference is given to using methanol.

The lactams of component A used may be any suitable lactams. Particular preference is given to using caprolactam. The aliphatic diamines of component B are preferably terminal linear $C_{4-12}$-alkylenediamines, more preferably $C_{4-8}$-alkylenediamines, especially hexamethylenediamine.

The terpolymers are formed essentially from the monomers A, B and C. To adjust the particular end group content, it is possible for minor additional amounts of mono- or dicarboxylic acids or mono- or diamines to be present. The addition of small amounts of copolymerizable comonomers (not more than 5% by weight, more preferably not more than 2.5% by weight, especially 1% by weight, based on the total amount of the monomers) is also possible. More preferably, the terpolymer comprises only the monomers of components A, B and C.

The inventive terpolymers comprise preferably 20 to 30% by weight of component A, 20 to 30% by weight of component B and 40 to 60% by weight of component C, where the total amount adds up to 100% by weight. Especially preferred are 20 to 30% by weight of component A, 20 to 27.5% by weight of component B and 45 to 55% by weight of component C. Especially preferred is a terpolymer based on 25% by weight of component A, 25% by weight of component B and 50% by weight of component C, where the particular amounts may vary by ±20%, preferably ±10%, especially ±5%.

The inventive terpolymers or solutions can be used for any coatings. They may especially be lacquers or films.

The inventive terpolymers or the inventive solutions comprising terpolymers are used to coat solid surfaces, for example cables and wires. For this purpose, the coating solutions may comprise all customary suitable additives. The solutions preferably additionally comprise flame retardants, viscosity modifiers, flow regulators, film formation aids, adhesion promoters or mixtures thereof. It is also possible for other customary additives to be present.

The inventive terpolymers can be prepared by any suitable processes. Preference is given to preparing them by reacting the monomeric components A, B and C with addition of water at a temperature in the range from 210 to 290° C., preferably 260 to 280° C., and a pressure in the range from 3 to 50 bar, preferably 5 to 20 bar.

Different possible preparation processes are explained in detail hereinafter.

In one embodiment of the invention, a process for preparing polyamides is performed in a tank reactor with a downstream extruder. Proceeding from lactam, diamines and dicarboxylic acids, and also dicycan, a stoichiometric monomer mixture is converted in a batch process in a stirred tank reactor. In this process, about 90% of the functional end groups, i.e. carboxyl and amino end groups, are converted, so as to result in a prepolymer with low molecular weight. Owing to the condensation reaction, water forms, such that a pressure builds up in the reactor at the set reaction temperature. As soon as the reaction has reached equilibrium, resulting in a constant pressure, the pressure can optionally be released, in which case water, with or without monomers, is removed in gaseous form, or the reaction is continued at constant pressure. The prepolymer is then transferred into an extruder in which it is converted further at temperatures above the melting point with discharge of water, with or without monomers or oligomers. No separate monomers are metered into the extruder, but rather merely the precondensate with the balanced stoichiometry is transferred out of the stirred tank reactor. The temperature and pressure profiles employed depend on the particular polyamide and the desired viscosity of the end product. For example, the conversion time in the stirred tank reactor may be 2 hours, in the course of which the pressure rises to 16 bar. On attainment of constant pressure, the temperature can be maintained for a further two hours before the removal is commenced by means of a twin-screw extruder.

It is also possible for two tank reactors to be operated alternately, in which case the prepolymers prepared in each case are transferred into the extruder.

In an alternative embodiment, a reservoir vessel for the extruder is connected between the stirred tank reactor and extruder. There is no further chemical conversion of the prepolymer in the reservoir vessel. Typically, the temperature from the stirred tank reactor is also maintained in the reservoir vessel, and the prepolymer is generally held under pressure (up to 30 bar). The prepolymer/water mixture is then decompressed into the extruder.

Alternatively, the preparation is effected by a process in an extruder, in which a solid mixture comprising the monomer mixture is heated in a corotary twin-screw extruder to a temperature in the range from 150 to 400° C. for a residence time of 10 seconds to 30 minutes with removal of steam, with or without diamines, through vents.

The process proceeds from a solid mixture which comprises a monomer mixture. The solid mixture may also comprise further ingredients such as fibers, fillers, dyes or assistants. Typically, the monomer mixture is present in salt form, in which case the water formed in the salt formation is very substantially removed before the reaction in the extruder. Remaining residual water can be removed in the extruder through vents. Typical water contents for a solid monomer mixture are in the range from 5 to 30% by weight, preferably 10 to 20% by weight, of the monomer mixture.

According to the invention, the reaction is performed in a corotary extruder which has vents. Suitable extruders are known to those skilled in the art and are described, for example, in DE-A-195 14 145.

The residence time in the extruder is 10 seconds to 30 minutes, preferably 10 seconds to 20 minutes, especially 30 seconds to 5 minutes.

The reaction is effected at a temperature in the range from 150 to 400° C., preferably 200 to 330° C. The temperature may especially be 250 to 330° C., particularly 260 to 330° C.

The pressure in the extruder is the autogenous pressure and is additionally also adjusted via the proportion of steam and diamine removed via the vents.

Preferably, the diamine and water removed from the vents are at least partly condensed, and the diamine thus obtained is recycled into the extruder. For example, the discharges from the vents can be combined and separated in a column, in which case steam is removed via the top, while a diamine/water condensate is discharged in the bottoms and recycled into the extruder.

It is possible in accordance with the invention to perform compounding with fibers, fillers, dyes or assistants directly in the extruder. To this end, the fibers, fillers, dyes, assistants or mixtures thereof are fed directly to the extruder, in addition to the monomer mixture. This allows further processing steps to be dispensed with.

The inventive extrusion may be followed by further processing steps such as a solid phase postcondensation and a granulation step. These processes are known per se and are described, for example, in the literature cited at the outset.

Fibers and fillers are listed, for example, as component (B) in EP-A-0 667 367.

Customary additives such as stabilizers and oxidation retardants, agents to counteract thermal decomposition, decomposition by ultraviolet light, lubricants and demolding agents, dyes, pigments and plasticizers are also described in EP-A-0 667 367. The polyamides prepared in accordance with the invention preferably have a glass transition temperature in the range from 60 to 95° C. and a melting temperature in the range from 170 to 270° C. They preferably have very low for example less than 15% or zero crystallinity and are transparent.

The monomer mixture can be prepared, for example, by drying aqueous monomer solutions, by precipitation in the course of temperature reduction or by venting a portion of the water or by mixing separate salts.

The polyamides are typically pelletized after the addition/condensation polymerization, extracted with water in order to removed remaining monomers and dimers, and then postcondensed to increase the molecular weight or the viscosity. In this case, the moisture introduced during the extraction has to be removed from the polyamide pellets. For this purpose, different processes are known.

An extract reduction is achieved by a continuous process for predrying and postcondensation of polyamide pellets in the solid phase, in which 1) the predrying is performed in a continuous drying apparatus (for example a tower drier, for example with a moving bed, moving bed drier, fluidized/pulsed bed drier), which is operated in countercurrent or cross-current with inert gas, steam or a mixture of inert gas and steam, at a pellet temperature in the range from 70 to 200° C., and 2) the subsequent continuous postcondensation is performed in a separate shaft with a moving bed at a pellet temperature which may be above, equal to or below the pellet temperature in stage (1) and is in the range from 120 to 210° C., by operating the shaft in countercurrent with inert gas, steam or a mixture of inert gas and steam, supplying the inert gas at at least two sites along the shaft, 15 to 90% of the inert gas being supplied at the bottom of the shaft and 10 to 85% of the inert gas in the upper half, preferably in the upper third, below the pellet surface.

The predrying (stage 1) is performed at a pellet temperature in the range from 70 to 200° C., preferably 120 to 180° C., especially 140 to 180° C.

The postcondensation is performed at a pellet temperature which is above, below or equal to the pellet temperature in stage (1). This pellet temperature in stage (2) is in the range from 120 to 210° C., preferably in the range from 160 to 180° C., especially in the range from 165 to 175° C.

The temperature in stage (2) is selected as a function of the desired molecular weight or the desired viscosity of the polyamide and the residence time in the 2 stages. For higher viscosities or higher molecular weights, higher temperatures are used.

The predrying is preferably performed at a pressure in the range from 1 to 10 bar abs., especially in the range from 1 to 5 bar abs. The postcondensation is preferably performed at a pressure in the range from 1 to 10 bar abs., especially in the range from 1 to 5 bar abs. An elevated pressure is generally established in order to prevent the ingress of air (oxygen).

According to the invention, the inert gas, steam or the inert gas/steam mixture is supplied in stage (2) at at least two sites along the shaft, 15 to 95% of the inert gas or of the inert gas/steam mixture being supplied at the bottom of the shaft, and 5 to 85% of the inert gas or of the inert gas/steam mixture in the upper third below the top of the shaft. At the same time, the pellets migrate from the top to the bottom of the shaft by means of gravity, and are thus treated in countercurrent with inert gas, steam or an inert gas/steam mixture.

Preferably, in stage (2), 30 to 90% of the inert gas, steam or of the inert gas/steam mixture, especially 50 to 85% of the inert gas, steam or inert gas/steam mixture, is supplied at the bottom of the shaft, and 10 to 70%, more preferably 15 to 50%, of the inert gas, steam or inert gas/steam mixture in the upper half, for example in the upper third or in the region of ⅛ to ⅜ of the shaft length below the pellet surface. When the shaft is completely filled, the top of the shaft and pellet surface are at the same height. In one embodiment, the inert gas or the inert gas/steam mixture is supplied at the bottom of the shaft and at about ¼ of the shaft length below the pellet level.

The dimensions of the shaft are preferably such that the gas velocity at the pellet surface does not attain a fluidization point.

The drying or extraction medium used in stages (1) and (2) may be any suitable inert gases. Preference is given to using, in stage (1), steam, nitrogen or mixtures thereof as the drying medium, and, in stage (2), nitrogen with a steam content of 0 to 90% by weight, preferably 0 to 10% by weight as a drying or extraction medium. Preferably, an oxygen-free drying or extraction medium is used in stages 1 and 2.

In stage (1), preferably 1 to 20 kg of inert gas, steam or inert gas/steam mixture, more preferably 2 to 10 kg of inert gas or inert gas/steam mixture, are introduced per kg of polyamide.

In stage (2), preferably at least 0.5 kg of inert gas, steam or inert gas/steam mixture per kg of polyamide, more preferably 1 to 7 kg of inert gas or inert gas/steam mixture per kg of polyamide, are introduced into the shaft.

The inert gas or inert gas/steam mixture conducted through the predrying and through the postcondensation in each case can be discarded after it has been discharged. Preferably, however, the inert gas or inert gas/steam mixture, after processing, is recycled partly or completely into the process.

The laden drying medium which leaves the apparatus in stage (1) is preferably treated and recycled partly or completely into the process. The treatment is effected by gas scrubbing at a temperature below 60° C., preferably below 45° C. In order to prevent accumulation of impurities in the inert gas, if necessary, preferably 0.1 to 10% by weight, especially about 1% by weight, of the drying medium leaving the apparatus is replaced by fresh medium in stage (1).

The laden drying or extraction medium which leaves the shaft at the top in stage (2) is preferably treated and recycled partly or completely into the process. For example, 0.1 to 10% by weight of the extraction medium leaving the shaft is replaced by fresh extraction medium. The treatment is effected analogously to stage 1, for example by gas scrubbing. Optionally, the laden drying or extraction medium from stage (2) can be used for heating/drying in stage (1).

In another embodiment, the drying medium from stage 1 is conducted into stage 2 after treatment.

The residence time of the pellets in stage (1) is preferably 0.2 to 15 hours, more preferably 0.5 to 10 hours.

The residence time in stage (2) is preferably 5 to 80 hours, especially 20 to 40 hours.

In apparatus terms, the drying and postcondensation can be designed and performed, for example, as described in EP-B-1 235 671. For example, a cross-flow drier can be used in stage (1). Alternatively, it is also possible to use a tower drier, belt drier or fluidized bed in stage (1).

In stage (2), preference is given to using a tower drier. A cooling apparatus may be connected downstream of the tower drier. Suitable geometries of the apparatuses are detailed in EP-B-1 235 671 in the description and in the drawings.

Reference is made here especially to the procedure with an active tower which has an additional inert gas circuit; see paragraphs [0032] to [0037] of EP-B-1 235 671.

An achievable moisture depletion (drying in the sense of the invention) leads generally from a starting moisture content of about 3 to 15% by weight in the polyamide pellets to values in the range from 0.02 to 4% by weight.

The polyamide which comes from the extraction and is used in the predrying has a residual monomer content in the range from greater than 0 to 0.08% by weight. Preferably a polyamide in which the residual monomer content is less than 0.05 or 0.03% by weight, and the cyclic residual dimer content is less than 0.1 or 0.08% by weight, is introduced into the predrier. In one embodiment of the invention, the residual monomer content at the outlet of stage 2 is greater than at the inlet of stage 1.

The removal of monomers and dimers in the extraction reliably prevents precipitates and deposits from forming on the apparatus, which could ultimately block the shafts and vapor line.

In stage (2), a separate shaft or tower drier is used, through which the polyamide flows in a moving bed owing to gravity. The throughput and the pellet level in the shaft can be used to establish different residence times and, together with the influence of different temperatures, produce products of different molecular weight. Appropriately, atmospheric oxygen is excluded in the tower drier, since it reacts with the hot polymer pellets, which leads to discoloration in the finished product.

One reason why the upstream connection of stage 1 is necessary is in order to remove the residual moisture from the extraction before the pellets pass into the tower drier (stage 2). Otherwise, the heat of evaporation required could lower the gas temperature down to below the condensation temperature of the vapors, and the pellets would conglutinate.

The decoupling of drying and postcondensation permits the two process steps to be operated at individually set temperature levels. In addition, the pellet residence time in each case can be set variably. The design of the size and the fill level of predrier and postcondenser can achieve the result of different residence times with equal mass flow overall.

The invention is illustrated in detail by the examples which follow.

EXAMPLES

Preparation of the Monomer Salt

To prepare the salt, a stirred apparatus was used. It consisted of a 2 l glass vessel with accompanying metal plate, which was fixed on the vessel with the aid of screws and a sealing ring. It was possible to discharge the salt solution homogeneously via orifices at the bottom. The glass vessel was connected to a circulation thermostat in order to heat the salt solution and to set the required temperature in the solution. An anchor stirrer for homogeneous mixing of the chemicals was mounted on the metal plate. A funnel and, for cooling, a jacketed coil reflux condenser with water as the cooling medium were secured on the metal plate. For inertization, the vessel was connected to a nitrogen gas line via the metal plate.

First, solid dicycan was melted in gently boiling water. Subsequently, water was initially charged in a 2 l glass vessel with reflux cooling, constant nitrogen supply (10 l h$^{-1}$) and stirrer speed n=200 min$^{-1}$, and the thermostat was set to 45° C.

Caprolactam, AH salt and adipic acid were then added successively. The molten dicycan was added dropwise to this solution while observing the temperature of the salt solution, which was not to exceed 60° C. The vessel was closed with a glass stopper, the temperature on the thermostat was increased to 95° C., and the mixture was stirred until homogeneity was established.

After discharge of the solution into a drying dish, the salt precipitated out owing to the cooling.

With constant nitrogen supply (400 l h$^{-1}$), the salt was subsequently dried in a vacuum cabinet at 50° C. down to a low water content. Thereafter, the residue was analyzed, and the precondensation was commenced at a sufficiently low value (w (H$_2$O)<1%).

Precondensation

After the synthesis thereof, the salts are precondensed in miniautoclaves in a heatable oil bath under pressure until equilibrium is established, in order to prevent precipitation of monomers and reaction products and hence to achieve high molecular weights of the products. In the course of this, it was necessary to ensure that the autoclaves are sealed tight and hence the monomers are not discharged with the steam. The precondensation was performed at 220° C.

The precondensation of the salts was performed in 24 ml miniautoclaves, into which the dried salt was introduced. These miniautoclaves are metal tubes which are closable by Swagelok closures at both ends. The autoclaves were heated using a steel bath which was enclosed by an insulation bag to prevent heat losses and was filled with Wood's alloy.

After melting the alloy, the autoclaves were immersed into the liquid metal bath by means of a holder. To establish the required temperature, a hotplate, an immersion heater, a temperature regulator and two single jacketed thermocouples were used, which were immersed into the molten alloy together with the immersion heater. In order to prevent heat losses, the metal bath was covered with aluminum foil. The apparatus was safeguarded by an excess temperature safeguard in the regulator, and by an ESTI cartridge (ESTI-Apparatebau GmbH, Berlin) which was immersed into the liquid metal.

A Teflon pipe was introduced into the interior of the miniautoclave, in order to prevent adhesion of the product to the walls after the cooling. One side of the autoclave was closed, and the salt was introduced up to half of the autoclave volume in a glove box purged with nitrogen for inertization. Thereafter, it was sealed completely and tightly.

The metal bath was first heated to 80° C. in order to obtain a melt. Subsequently, the required reaction temperature was set on the regulator. The miniautoclave was secured to the holder with the aid of a wire, immersed into the metal bath and covered with aluminum foil.

The autoclave was removed again from the metal after 8 hours at 220° C. in each case, and cooled under air for 1 min. After removing the wire, it was placed into boiling water in order to remove remaining metal on the outside. To open the autoclave, the particular closure was immersed into the metal bath and then opened. The copolyamide product was removed.

Heat Treatment of the Precondensates

The aim in the last preparation step was to remove the water of dissolution of the salts still present and the water of reaction which formed in the polycondensation completely by heat treatment of the precondensates in the solid phase at 175° C. In this way, the equilibrium was shifted to the polyamide side to obtain high molecular weight products. The properties thereof were then determinable with the aid of dynamic differential calorimetry. This involved first drying the precondensates at low temperatures. For the heat treatment and hence for the removal of the water from the precondensates, a drying cabinet was used, into which an inertizing nitrogen stream was supplied via a rotameter. The precondensates were first dried at temperatures of 80° C. and 120° C. for 72 h in each case under a constant nitrogen supply (operating volume=400 l h$^{-1}$) and then heat treated at 175° C. for 24 h. The properties of the products are compiled in table 1.

Compositions of the Copolyamides

The different stoichiometrically equivalent compositions of the copolyamides are listed in table 1.

| | C1 w [%] | C2 w [%] | C3 w [%] | C4 w [%] | C5 w [%] |
|---|---|---|---|---|---|
| Substance | | | | | |
| Caprolactam | 30.4 | 28.3 | 32.6 | 25.4 | 35.4 |
| Adipic acid | 33.5 | 33.5 | 33.5 | 36.3 | 30.7 |
| Hexamethylenediamine | 14.9 | 12.2 | 17.6 | 17.1 | 12.6 |
| Dicycan | 21.3 | 26.0 | 16.4 | 21.3 | 21.3 |
| Starting weight after salt | | | | | |
| Capro (A) | 30.4 | 28.3 | 32.6 | 25.4 | 35.4 |
| HMD + ADS (B) | 33.5 | 27.6 | 39.7 | 38.5 | 28.5 |
| D + ADS (C) | 36.2 | 44.2 | 27.8 | 36.2 | 36.2 |

-continued

|  | C1 w [%] | C2 w [%] | C3 w [%] | C4 w [%] | C5 w [%] |
|---|---|---|---|---|---|
| Components in PA |  |  |  |  |  |
| N 6 | 33.1 | 30.8 | 35.5 | 27.9 | 38.3 |
| N 66 | 31.5 | 26 | 37.3 | 36.5 | 26.6 |
| N D6 | 35.4 | 43.2 | 27.2 | 35.7 | 35.1 |
| Tg [° C.] | 88.0 | 94.0 | 77.0 | 84.0 | 87.0 |
| Tm [° C.] | 207.5 | 212.1 | 191.6 | 212.9 | 207.2 |
| ΔH$_m$ [J/g] | 4.0 | 3.0 | 3.0 | 19.0 | 4.0 |
| K [%] | 1.8 | 1.3 | 1.3 | 8.4 | 1.8 |
| VN [ml/g] | 155.0 | 163.0 | 148.0 | 150.0 | 130.0 |
| Amino | 92.2 | 57.7 | 84.0 | 62.8 | 64.3 |
| Carboxyl | 61.0 | 63.0 | 55.0 | 64.0 | 70.0 |

Analyses of the Copolyamides
Dynamic Differential Calorimetry

To determine the glass transition and melting temperatures and the crystallinity, 8.5 mg of the copolyamide in each case were weighed into a sample pan and placed into the oven of the differential calorimeter with the reference sample (air), and the DSC test cell was purged with nitrogen (operating volume=50 ml min$^{-1}$) for 5 min. The cell was then heated by a temperature program with a heating rate β=20 K min$^{-1}$ up to 380° C. (copolyamide B) or to 280° C. (copolyamide A), in order to eliminate the influence of the thermal history. After cooling the oven at β=20 K min$^{-1}$ to 60° C., the cell was heated again in a second heating cycle at β=20 K min$^{-1}$ to the temperatures specified, and then the apparatus was cooled. The end temperatures were kept constant for 5 min in each case. The curve profiles obtained were used to determine the glass transition temperature T$_g$ and melting temperature T$_m$, and the enthalpy of fusion ΔH$_m$, with the aid of an evaluation program.

C6

3.055 g of an aqueous solution of hexamethylenediamine (69.96% by weight), 5.224 g of adipic acid, 3.651 g of dicycan and 4.181 g of caprolactam were weighed into a reagent bottle, placed into an unstirred autoclave and purged 3 times with 10 bar of nitrogen each time. The autoclave was heated to 280° C., and an elevated pressure of 16 bar was maintained at this temperature for 2 hours. Subsequently, the autoclave was decompressed to ambient pressure within 110 minutes, and the postcondensation was performed at the same temperature under a nitrogen current for 120 minutes. The product withdrawn was extracted with water and dried.

The transparent clear polymer which was prepared under these conditions, with a composition of 30/30/40% by weight of the N6/N66/ND6 components, exhibited a viscosity of 85 to 132 ml/g (0.5% by weight in conc. sulfuric acid) and a glass transition temperature between 77° C. and 79° C. (DSC, 2nd cooling run at 20 K/min). The solution, prepared at room temperature, of 10% by weight of the terpolymer in a solvent mixture composed of ethanol and water (80:20% by weight) was clear and was found to be stable at room temperature.

C7

2.738 g of an aqueous solution of hexamethylenediamine (69.96% by weight), 5.314 g of adipic acid, 4.181 g of dicycan and 3.747 g of caprolactam were weighed into a reagent bottle, placed into an unstirred autoclave and purged 3 times with 10 bar of nitrogen each time. The autoclave was heated to 280° C., and an elevated pressure of 16 bar was maintained at this temperature for 2 hours. Subsequently, the autoclave was decompressed to ambient pressure within 110 minutes, and the postcondensation was performed at the same temperature under a nitrogen current for 120 minutes. The product withdrawn was extracted with water and dried.

The transparent clear polymer which was prepared under these conditions, with a composition of 27/27/46% by weight of the N6/N66/ND6 components, exhibited a viscosity of 84 to 112 ml/g (0.5% by weight in conc. sulfuric acid) and a glass transition temperature between 88° C. and 91° C. (DSC, 2nd cooling run at 20 K/min). The solution, prepared at room temperature, of 10% by weight of the terpolymer in a solvent mixture composed of ethanol and water (80:20% by weight) was clear and was found to be stable at room temperature.

The invention claimed is:

1. A solution comprising a terpolymer formed from the monomers of components A, B and C, the total amount of which adds up to 100% by weight,
   a) 20 to 30% by weight of lactams as component A,
   b) 20 to 27.5% by weight of equimolar amounts of adipic acid and one or more aliphatic diamines as component B,
   c) 45 to 55% by weight of equimolar amounts of adipic acid and 4,4'-diaminodicyclohexylmethane (dicycan) as component C,
   in an aromatics-free solvent system comprising
   50 to 100% by weight of C$_{1-4}$-alkanol,
   0 to 50% by weight of water and
   not more than 10% by weight of further aromatics-free solvents,
   where the total amount of the solvent system adds up to 100% by weight.

2. The solution according to claim 1, wherein 70 to 100% by weight of C$_{1-4}$-alkanol, 0 to 30% by weight of water and not more than 5% by weight of further aromatics-free solvents are present in the solvent system, where the total amount of the solvent system adds up to 100% by weight.

3. The solution according to claim 1, additionally comprising flame retardants, viscosity modifiers, flow regulators, film formation aids, adhesion promoters or mixtures thereof.

4. The solution according to claim 1, wherein the lactam of component A is caprolactam and the aliphatic diamine of component B is a terminal linear C$_{4-6}$-alkylenediamine.

5. A terpolymer formed from the monomers of components A, B and C, the total amount of which adds up to 100% by weight,
   a. 20 to 30% by weight of lactams as component A
   b. 20 to 27.5% by weight of equimolar amounts of adipic acid and one or more aliphatic diamines as component B
   c. 45 to 55% by weight of equimolar amounts of adipic acid and 4,4'-diaminodicyclohexylmethane (dicycan) as component C.

6. The terpolymer according to claim 5, wherein the lactam of component A is caprolactam and the aliphatic diamine in component B is hexamethylenediamine.

7. A process for preparing terpolymers, wherein said terpolymer is formed from monomers of components A, B and C, the total amount of which adds up to 100% by weight,
   a) 20 to 30% by weight of lactams as component A,
   b) 20 to 27.5% by weight of equimolar amounts of adipic acid and one or more aliphatic diamines as component B,
   c) 45 to 55% by weight of equimolar amounts of adipic acid and 4,4'-diaminodicyclohexylmethane (dicycan) as component C,
   said process comprising reacting the monomers of components A, B and C with addition of water at a temperature in the range from 210 to 290° C. and a pressure in the range from 3 to 50 bar.

8. The solution according to claim 2, wherein not more than 2.5% by weight of further aromatics-free solvents are present in the solvent system.

\* \* \* \* \*

UNITED STATES PATENT AND TRADEMARK OFFICE
CERTIFICATE OF CORRECTION

PATENT NO. : 8,658,724 B2  Page 1 of 1
APPLICATION NO. : 13/378980
DATED : February 25, 2014
INVENTOR(S) : Schmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 121 days.

Signed and Sealed this
Twenty-ninth Day of September, 2015

Michelle K. Lee
*Director of the United States Patent and Trademark Office*